United States Patent

Kelley et al.

Patent Number: 5,384,050
Date of Patent: Jan. 24, 1995

[54] HYDRAZONES AS OXYGEN SCAVENGERS IN BOILER WATER SYSTEMS

[75] Inventors: Douglas G. Kelley; Deborah M. Rogers, both of Naperville, Ill.

[73] Assignee: Nalco Chemical Company, Naperville, Ill.

[21] Appl. No.: 145,554

[22] Filed: Nov. 4, 1993

[51] Int. Cl.$^6$ .............................. C02F 1/20
[52] U.S. Cl. ............... 210/750; 210/757; 252/188.28; 252/390; 422/16
[58] Field of Search ............ 210/750, 757, 749; 252/188.28, 390, 392; 422/16, 17

[56] References Cited

U.S. PATENT DOCUMENTS

| | | | |
|---|---|---|---|
| 3,043,888 | 7/1962 | Pray et al. | 260/652.5 |
| 3,876,371 | 4/1975 | Costain et al. | 252/390 |
| 4,269,717 | 5/1981 | Slovinsky | 210/750 |
| 4,469,609 | 9/1984 | Bandlish et al. | 252/26 |
| 4,479,917 | 10/1984 | Rothgery et al. | 422/16 |
| 4,540,494 | 9/1985 | Fuchs et al. | 210/750 |
| 5,258,125 | 11/1993 | Kelley et al. | 210/750 |

OTHER PUBLICATIONS

Kirk–Othmer Encyclopedia of Chemical Technology, Second Edition, Interscience Publishers, vol. 11, p. 187.

Primary Examiner—Peter A. Hruskoci
Attorney, Agent, or Firm—Robert A. Miller; James J. Drake

[57] ABSTRACT

A method of removing dissolved oxygen from boiler water having and alkaline pH is disclosed. The method uses at least one hydrazone compound of one of the following formulae:

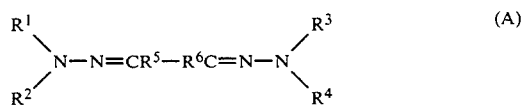

(A)

wherein $R^1$, $R^2$, $R^3$ and $R^4$ are independently selected from hydrogen, $C_1$–$C_{16}$ alkyl, aryl, substituted alkyl or substituted aryl, and $R^5$ and $R^6$ are independently selected from hydrogen, $C_1$–$C_{16}$ alkyl, aryl, substituted alkyl, or substituted aryl,

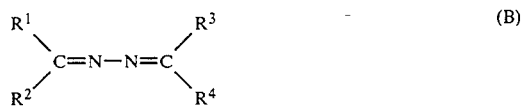

(B)

Preferably, an oxidation-reduction catalyst such as Cu(II) is used as well. The hydrazones used in the present invention are highly shelf stable and do not suffer the toxicity of hydrazine.

9 Claims, No Drawings

HYDRAZONES AS OXYGEN SCAVENGERS IN BOILER WATER SYSTEMS

BACKGROUND OF THE INVENTION

1. Field of the Invention

The invention relates to a method for controlling corrosion in boiler systems and, more particularly, to treating boiler water to remove dissolved oxygen and to passivate metal surfaces, while providing a composition which is stable at room temperature over six months.

2. Description of the Prior Art

Efficient operation of boilers and other steam-run equipment requires chemical treatment of feedwater to control corrosion. corrosion in such systems generally arises as a result of oxygen attack of steel in water supply equipment, pre-boiler systems, boilers, and condensate return lines. Oxygen attack of steel is exacerbated by the unavoidable high temperatures found in boiler equipment. Since acidic conditions also accelerate corrosion, most boiler systems are run in an alkaline environment.

The action of dissolved gases such as oxygen and carbon dioxide are two of the main factors that lead to feedwater system and boiler corrosion. In order to understand the role of dissolved gases in corrosion, one must understand the electrochemical nature of corrosion.

Corrosion processes involve reactions where one species is oxidized $$M \rightarrow M^{2t} + 2e^-$$

and another is reduced.

$$x + e^- \rightarrow x^-$$

In boiler systems the two species involved in the redox chemistry are typically two different metals, a metal and oxygen, or a metal and water. Under most conditions, oxidation of iron occurs.

$$Fe^0 \rightarrow Fe^{2t} + 2e^-$$

A current of electrons then flows from this anodic region to a point where reduction takes place. If oxygen is present, the cathodic reaction is $$O_2 + H_2O + 4e^- \rightarrow 4OH^-$$

In the absence of oxygen, water is reduced to hydrogen.

$$2H_2O + 2e^- \rightarrow H_2 + 2OH^-$$

Any agent that inhibits either the anodic or cathodic reaction will stop corrosion from occurring. Metal passivation, the formation of a protective oxide film, is one common example of a process that inhibits corrosion by blocking one of the electrochemical reaction pathways.

The severity of oxygen corrosion will depend on the concentration of dissolved oxygen in the water, water pH and temperature. As water temperature increases, corrosion in feed lines, heaters, boilers, steam and return lines made of iron and steel increases.

In most modern boiler systems, dissolved oxygen is handled by first mechanically removing most of the dissolved oxygen and then chemically scavenging the remainder. Mechanical degasification is typically carried out with vacuum degasifiers which will reduce oxygen levels to less than 0.5–1.0 mg/L or with deaerating heaters, which will reduce oxygen concentration to the range of 0.005–0.010 mg/L.

Chemical scavenging of the remaining dissolved oxygen is widely accomplished by treating the water with hydrazine. See, for example, the Kirk-Othmer Encyclopedia of Chemical Technology, Second Edition, Interscience Publishers, Volume II, page 187. As explained in Kirk-Othmer, hydrazine efficiently eliminates the residual oxygen by reacting with the oxygen to give water and gaseous nitrogen. In addition, hydrazine is a good metal passivator since it forms and maintains an adherent protective layer of magnetite over iron surfaces.

It is, however, widely recognized that hydrazine is an extremely toxic chemical. Kirk-Othmer reports that it is highly toxic and readily absorbed through the mouth, skin and respiratory system, and that permanent corneal damage may result from contact with the eye. Low doses may cause central nervous system depression and high doses may cause, convulsions and other damaging side effects.

Thus, it is an object of this invention to provide oxygen scavenging treatments which are free of or reduced in the dangers inherent to hydrazine, but which scavenge oxygen and passivate steel surfaces under typical boiler use conditions.

SUMMARY OF THE INVENTION

The invention relates to a method for controlling corrosion in boiler systems and, more particularly, to treating boiler water to remove dissolved oxygen and to passivate metal surfaces, while providing a composition which is stable at room temperature over six months.

DESCRIPTION OF THE PREFERRED EMBODIMENTS

One aspect of the invention provides a method for removing dissolved oxygen from boiler water having an alkaline pH. The method comprises adding to the boiler an oxygen scavenging amount of at least one hydrazone compound. Preferably, the hydrazone is selected from the group consisting of $$\begin{array}{c} R^1 \\ \phantom{R}\diagdown \\ \phantom{RRR}N-N=CR^5-R^6C=N-N \\ \phantom{R}\diagup \phantom{RRRRRRRRRRRRRRR}\diagdown \\ R^2 \phantom{RRRRRRRRRRRRRRRRRRR} R^4 \end{array} \quad (A)$$

wherein $R^1$, $R^2$, $R^3$ and $R^4$ are independently selected from hydrogen, $C_1$–$C_{16}$ alkyl, aryl, substituted alkyl or substituted aryl, and $R^5$ and $R^6$ are independently selected from hydrogen, $C_1$–$C_{16}$, alkyl, aryl, substituted alkyl or substituted aryl, and $$\begin{array}{c} R^1 \phantom{RRRRRRRRRR} R^3 \\ \phantom{R}\diagdown \phantom{RRRRRRRR} \diagup \\ \phantom{RRR}C=N-N=C \\ \phantom{R}\diagup \phantom{RRRRRRRR} \diagdown \\ R^2 \phantom{RRRRRRRRRR} R^4 \end{array}$$

wherein $R^1$, $R^2$, $R^3$ and $R^4$ have the same meaning as above.

Preferably, an oxidation-reduction catalyst is used as well. According to a preferred embodiment, the hydrazones are added at a level of at least about 0.5 moles of a dihydrazone (A) per mole of dissolved oxygen or 1 mole of a monohydrazone (B) per mole of dissolved oxygen. Preferably, the boiler water is subjected to mechanical deaeration to reduce the level of dissolved oxygen and the hydrazone is added to the boiler water after deaeration to remove remaining dissolved oxygen. The hydrazone may also be used in conjunction with an oxidation-reduction catalyst.

The hydrazone may be either a monohydrazone of the general formula

or a dihydrazone of the general formula

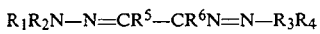

wherein $R_1$, $R_2$, $R_3$, $R_4$, $R_5$ and $R_6$ have the meanings described above.

The monohydrazones, which contain a central hydrazino group, are most easily prepared by reacting one mole of hydrazine with two moles of a carbonyl compound (i.e., an aldehyde or ketone). The dihydrazones, which contain terminal hydrazino groups, are prepared by reacting a dicarbonyl compound with two moles of hydrazine. In the dihydrazone preparation, care must be taken to add the dicarbonyl compound slowly with stirring to a hydrazine solution, to avoid formation of side products.

Typical starting aldehydes include acetaldehyde, butyraldehyde, propionaldehyde, hydroxyacetaldehyde, and the like. Starting ketones include acetone, butanone, hydroxyethyl ketone, dihydroxy acetone, acetaldehyde, butyraldehyde, glucose and the like. Starting dicarbonyls include glyoxal pyruvaldehyde, biacetyl(2,3-butanedione), glutaraldehyde.

In general, it is most preferred to use the carbonyls or dicarbonyl having fewest carbon atoms (e.q., acetone, acetaldehyde, glyoxal, glutaraldehyde, biacetyl and pyruvaldehyde) inasmuch as the fewer the number of carbon atoms in the hydrazone, the less organic impurities are generated during hydrolysis under boiler conditions. Accordingly, aromatic carbonyls are less preferred.

Preferred dihydrazone compounds are glyoxaldihydrazone

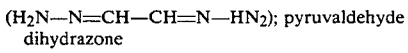

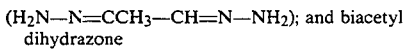

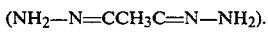

A further aspect of the invention provides a method of removing dissolved oxygen from boiler water having alkaline pH and passivating boiler surfaces, comprising adding to the boiler water at least 0.5 moles of the hydrazone per mole of dissolved oxygen along with preferably about 0.2% to about 20% by weight based on the hydrazone of a catalyst capable of undergoing oxidation-reduction reactions. Preferred catalysts of the invention include copper, cobalt, hydroquinone, diethylhydroxylamine, and an especially preferred catalyst is copper (II).

Although the hydrazones of this invention may be added to the boiler system at any point, it is most efficient to treat the boiler feedwater, preferably as it comes from the degasifier. Residence times prior to steam formation should be maximized to obtain maximum corrosion protection. While these compounds will control corrosion even if the residence times are as low as about 2-3 minutes, residence times of about 15-20 minutes or more are preferred.

The amount of hydrazone required to effectively scavenge oxygen from the boiler water is dependent upon the amount of oxygen actually present therein. It is generally desirable that at least about 0.5 moles of dihydrazone at least about 1.0 moles a of monohydrazone be used per mole of oxygen. These minimum levels of hydrazone will have the added benefit of effectively passivating metal surfaces. Of course, levels of hydrazone considerably in excess of the stoichiometric minimum may be required, particularly for treating boiler feedwater under static storage conditions. Under such static conditions, for example, treatment levels of about 160 moles or more of hydrazone per mole of oxygen have proven effective in controlling corrosion.

The hydrazones of this invention are effective oxygen scavengers and metal passivators over the entire range of temperatures to which boiler feedwater is generally subjected. Typically, these temperatures will be in the range of about 102°–350° F.

While it is well known that each molecule of dihydrazone is capable of being hydrolyzed to 2 molecules of hydrazine, and each molecule of monohydrazone to one molecule of hydrazine, the extent of hydrolysis under typical storage conditions, i.e. 75° C., is minimal.

A 1.5 wt. % aqueous minimal solution of pyruvaldehyde dihydrazone was monitored by H' NMR for over 2 months at RT. During that time there was only a 2 mole % change in the NMR spectra, verifying the stability of dihydrazones, especially with respect to generation of free hydrazine from the product solutions.

In one important embodiment, the present invention provides a method of removing dissolved oxygen from boiler water by adding to the water an oxygen scavenging amount of a hydrazone which is soluble in water. The hydrazone may be used either as a dry powder or as a solution.

While the hydrazones of this invention may be used alone in the present application, it is preferred that they be catalyzed. For this purpose, it is desirable to use catalysts which undergo oxidation-reduction reactions. For example, hydroquinone, other quinones and diethylhydroxylamine (DEHA) can be used to catalyze the hydrazone since they are capable of undergoing oxidation-reduction reactions. When a quinone or DEHA catalyst is used, the amount of quinone added in relation to the hydrazone should be, preferably, in the range of 0.2% to 20% by weight of the hydrazone.

Another, more preferred, oxidation-reduction catalyst useful with the hydrazones in the present invention as a metal ion such as copper, or cobalt, preferably in a stabilized form. The amount of metal used in relation to the hydrazone should be preferably in the range of about 0.2% to about 20% by weight of the hydrazone. A particularly preferred metal catalyst is copper (II) salts.

While not wishing to be bound by any particular theory, the inventors believe that copper catalysts are particularly suitable in allowing the oxidation-reduction reaction to unexpectedly occur in aqueous media. many radical chain mechanisms do not occur in water because of chain termination due to the instability of the chain carrying radicals in water. However, it is believed that the copper-catalyzed chain reaction occurs because the copper catalyst forms a complex with the hydrazone which initiates the reaction by reacting with molecular oxygen to give $CuO_2$ or superoxide ($O_2-$). It is believed that these components abstract a hydrogen atom from the free hydrazone to give a hydrogen radical which further reacts with molecular oxygen to propagate the chain mechanism, leading to complete oxygen scavenging.

Example 4 shows that at least two species of hydrazones, glyoxaldihydrazone and biacetyl dihydrazone, is at least as effective as oxygen scavengers as hydrazine, without the severe toxicity of hydrazine.

While the invention has been described in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

The following Examples are provided to further illustrate the invention. In these Examples and elsewhere throughout this application, all parts and percentages are by weight, on a dry solids basis; "ppm" denotes parts per million and "ppt" denotes parts per thousand; and all temperatures are in degrees centigrade (Celsius) unless expressly stated to be otherwise.

EXAMPLE 1

Preparation of the Compound Glyoxaldihydrazone (GDHZ) ($NH_2-N=CH-CH=N-NH_2$)

This Example illustrates the preparation of the simplest (unsubstituted) of the dihydrazones, glyoxaldihydrazone. The compound was prepared as follows.

15 ml of a 35% solution (10.9M) of hydrazine was stirred in a 50 ml beaker in an ice bath. About 50 ml of 95% ethanol was placed in the ice bath as well. 7.0 ml of 6.9M glyoxal (CHOCHO) was added dropwise to the hydrazine, with stirring (mole ratio $N_2H_4$:CHO-CHO=0.1635: 0.0483).

After about 10 minutes the solution became a cloudy white and was allowed to stand in the ice bath for an hour. The precipitate which formed was filtered using a suction filtration apparatus, washed using the cold 95% ethanol, and then dried in a vacuum desiccator. The product was white with a pale green-yellow tinge.

EXAMPLE 2

Preparation of Pyruvaldehyde Dihydrazone (PHZ)$H_2N-N=CCH_3-CH=N-NH_2$)

The procedure of Example I was repeated, up to the point where glyoxal is added. At that point, instead of glyoxal, 9.0 ml of a 40 weight percent solution (5.55M) or 0.0500 moles of pyruvaldehyde was added dropwise to the hydrazine. The resulting solution was refrigerated overnight. When no precipitate resulted, the solution was rotary evaporated to reduce the volume by one-halt, cooled to room temperature, and again refrigerated (overnight?). The resulting precipitate was washed with ethanol and ether and vacuum dried.

A sample of the material submitted for CHN elemental analysis gave the following results: C %, 36.2 (36.0); H %, 8.5 (8.0); and N %, 55.3(56.0). The observed percentages agree well with the theoretical values (given in parentheses), indicating that the reaction yielded pyruvaldehyde dihydrazone (PHZ). NMR characterization also confirmed the product to be PHZ.

EXAMPLE 3

Preparation of Biacetyl Dihydrazone ($H_2N-N=CCH_3C=NNH_2$)

The disubstituted dihydrazone, biacetyl dihydrazone (BHZ), was prepared as follows.

15 ml of a stock solution of 35 weight percent hydrazine (0.1635 moles) were added to a 50 ml beaker and stirred over an ice bath. A separate container for ethanol was placed in the ice bath. 44 ml of a stock solution of 99 weight percent biacetyl ($CH_3COCOCH_3$) (0,050 moles) were added, dropwise, to the hydrazine. The resultant precipitate was filtered by suction filtration and washed with the cold ethanol plus ether. The washed filtrate was dried in a vacuum desiccator.

A sample of the material submitted for CHN elemental analysis gave the following results: C %, 42.6 (42.1); H %, 9.2 (8.8); and N %, 48.0 (49.1). The observed percentages agree well with the theoretical values (given in parentheses), indicating that the reaction yielded biacetyl dihydrazone (BHZ).

EXAMPLE 4

Relative Oxygen Scavenging Capabilities of GHZ, BHZ and Hydrazine

The dihydrazone (GHZ) of Example 1 and biacetyl dihydrazone (BHZ) of Example 3 were compared against glyoxal hydrazine (HZ). In each case, 1000 parts per million ppm of the oxygen scavenger (0.050 grams in 50 ml water for the GHZ and BHZ and 0.29 ml of 35% solution of $N_2H_4$ in 100 ml) and 2 ppm of Cu(II) as catalyst were added to a solution containing 8.9 ppm dissolved oxygen at 23° C. The time required to reduce the oxygen concentration to 2 ppm was measured. Each of the oxygen scavengers reduced the oxygen concentration to 2.0 ppm in about 10 minutes, indicating that at room temperature the dihydrazones scavenge oxygen comparably to that of hydrazine. However, since each dihydrazone will decompose under boiler conditions to give two moles of hydrazine, enhanced oxygen scavenging may be expected for dihydrazones under actual boiler conditions.

A comparative summary of Cu(II) catalyzed BHZ and hydrazine at 23° C. at a 1:1 molar ratio of scavenger is shown in Table I below:

TABLE I

| Solution | Comparison of Cu(II) Catalyzed Oxygen Scavengers At 23° C. | |
|---|---|---|
|  | % oxygen removed | Reaction time (min) |
| $N_2H_4$ | 78 | 10 |
| BHZ | 77 | 9 |

$H_2H_4$ = hydrazine
BHZ = biacetyl dihydrazone

Changes can be made in the composition, operation and arrangement of the method of the present invention described herein without departing from the concept and scope of the invention as defined in the following claims:

We claim:

1. A method for removing dissolved oxygen from boiler water having an alkaline pH which comprises adding to the boiler water an oxygen scavenging amount of at least one dihydrazone compound selected from the group consisting of glyoxaldihydrazone ($H_2N-N=CH-HC=N-NH_2$), pyruvaldehyde dihydrazone ($H_2N-N=CCH_3-CH_3C=N-NH_2$) and biacetyl dihydrazone ($H_2N-N=CCH_3-CH_3C=N-NH_2$).

2. A method according to claim 1, wherein the dihydrazone is added at a level of at least about 0.5 moles of dihydrazone monohydrazone per mole of dissolved oxygen.

3. A method according to claim 1, wherein the boiler water is subjected to a mechanical deaeration step to reduce the level of dissolved oxygen and the dihydrazone is added to the boiler water after the deaeration step to remove remaining dissolved oxygen.

4. A method according to claim 1, wherein the dihydrazone is used in conjunction with an oxidation-reduction catalyst selected from the group consisting of cobalt (II), copper (II), hydroquinone (HQ), diethylhydroxylamine (DEHA) and mixtures thereof.

5. A method according to claim 4, wherein the catalyst contains copper (II).

6. A method according to claim 4, wherein the catalyst contains cobalt (II).

7. A method according to claim 4, wherein the catalyst contains hydroquinone, (HQ).

8. A method according to claim 4, wherein the catalyst contains diethylhydroxylamine (DEHA).

9. A method of removing dissolved oxygen from boiler water having an alkaline pH and passivating boiler surfaces, the method comprising the steps of adding to the boiler water at least about 0.5 moles of a dihydrazone compound per mole of dissolved oxygen and about 0.2% to about 20% by weight based on the dihydrazone of a catalyst capable of undergoing oxidation-reduction reactions, wherein the dihydrazone compound is selected from the group consisting of glyoxaldihydrazone ($H_2N-N=CH-HC=N-NH_2$), pyruvaldehyde dihydrazone ($H_2N-N=CCH_3-CH_3C=N-NH_2$) and biacetyl dihydrazone ($H_2N-N=CCH_3-CH_3C=N-NH_2$).

* * * * *